(12) United States Patent
Schmidt et al.

(10) Patent No.: US 7,855,240 B2
(45) Date of Patent: Dec. 21, 2010

(54) FORMULATED RESIN COMPONENT FOR USE IN SPRAY-IN-PLACE FOAM SYSTEM TO PRODUCE A LOW DENSITY POLYURETHANE FOAM

(75) Inventors: Katrina Schmidt, Toronto (CA); Chris Janzen, Toronto (CA); Greg Gardin, Cambridge (CA); Chris Lacarte, Blackie (CA)

(73) Assignee: BASF Corporation, Mt. Olive, NJ (US)

( * ) Notice: Subject to any disclaimer, the term of this patent is extended or adjusted under 35 U.S.C. 154(b) by 1167 days.

(21) Appl. No.: 10/644,450

(22) Filed: Aug. 20, 2003

(65) Prior Publication Data

US 2005/0043423 A1 Feb. 24, 2005

(51) Int. Cl.
C08G 18/28 (2006.01)

(52) U.S. Cl. .................. 521/163; 521/130; 521/159; 521/167; 521/170; 521/174

(58) Field of Classification Search ........... 521/130, 521/163, 167, 170, 174, 159
See application file for complete search history.

(56) References Cited

U.S. PATENT DOCUMENTS

| 3,094,434 | A | | 6/1963 | Chapman et al. |
|---|---|---|---|---|
| 3,989,651 | A | | 11/1976 | Lockwood et al. |
| 4,507,336 | A | | 3/1985 | Cenegy |
| 4,839,397 | A | * | 6/1989 | Lohmar et al. ............ 521/159 |
| 4,904,703 | A | | 2/1990 | Sufi |
| 4,972,004 | A | * | 11/1990 | Randall et al. ............ 521/159 |
| 4,981,880 | A | | 1/1991 | Lehmann et al. |
| 5,006,569 | A | * | 4/1991 | Stone ..................... 521/118 |
| 5,026,737 | A | | 6/1991 | Ohnuma et al. |
| 5,137,929 | A | | 8/1992 | Demmin et al. |
| 5,340,900 | A | | 8/1994 | Spitzer et al. |
| 5,397,810 | A | | 3/1995 | Ozaki et al. |
| 5,449,699 | A | | 9/1995 | Green |
| 5,472,988 | A | | 12/1995 | Nakamura et al. |
| 5,496,869 | A | | 3/1996 | Williams et al. |
| 5,594,040 | A | * | 1/1997 | Gerber et al. ............. 521/159 |
| 5,621,051 | A | | 4/1997 | Okutani et al. |
| 5,859,082 | A | | 1/1999 | Sufi |
| 6,448,364 | B1 | * | 9/2002 | Clatty et al. ............... 528/61 |
| 6,527,203 | B2 | | 3/2003 | Hurray et al. |
| 6,534,556 | B2 | * | 3/2003 | Lacarte et al. ............. 521/174 |
| 6,586,487 | B1 | * | 7/2003 | Nodelman et al. .......... 521/130 |
| 6,737,471 | B2 | * | 5/2004 | Lorenz et al. ............. 524/773 |
| 2002/0035165 | A1 | | 3/2002 | Bruchmann et al. |
| 2002/0169227 | A1 | | 11/2002 | Allen et al. |

FOREIGN PATENT DOCUMENTS

EP 0 488 219 B1 3/1997

OTHER PUBLICATIONS

Arch Chemicals Product Bulletin (Apr. 2004).*
Bayer Multranol 4050 Product Bulletin (Jan. 1997).*
Office Action issued by the European Patent Office for Application No. 04 017 067.2-2115 on Jan. 26, 2006.

* cited by examiner

*Primary Examiner*—John Cooney
(74) *Attorney, Agent, or Firm*—Howard & Howard Attorneys PLLC

(57) ABSTRACT

The subject invention provides an open-celled polyurethane foam formed from a polyurethane spray foam system that mixes a formulated resin component with an isocyanate component. The resultant open-celled polyurethane spray foam has a density of about ½ pound per cubic foot. The resin component includes water as a blowing agent, a first aliphatic, amine-initiated polyol having a number-average molecular weight of from 150 to 500 and having tetra-functionality, and a second polyol having terminal hydroxyl groups and having a number-average molecular weight of from 3500 to 8000. A curing component having at least one primary amine group and having a number-average molecular weight of from 150 to 5000 is also included in the resin component. The spray foam system reacts a) the resin component and b) the isocyanate component in a volumetric ratio of a) to b) of from 1:1.2 to 1:5 and having an isocyanate index of from 15 to 70.

12 Claims, 2 Drawing Sheets

FORMULATED RESIN COMPONENT FOR USE IN SPRAY-IN-PLACE FOAM SYSTEM TO PRODUCE A LOW DENSITY POLYURETHANE FOAM

BACKGROUND OF THE INVENTION

1) Field of the Invention

The subject invention relates to a formulated resin component for use in a spray-in-place foam system to produce a low density polyurethane foam. More particularly, the subject invention relates to low density open-celled polyurethane foams for use as an insulation material in structures, such as buildings.

2) Description of Related Art

Various formulated resin components are used in polyurethane spraying systems to produce polyurethane foams. Some formulated resin components are shown generally in U.S. Pat. Nos. 5,859,082 and 3,094,434. These resin components typically include a blowing agent, additives, and a polyol blend of various constituents. The resin component is sprayed with an isocyanate component to form the polyurethane foam. During spraying, the resin component reacts with the isocyanate component. The resin component and the isocyanate component are sprayed at a volumetric ratio of 1 to 1 using typical spraying equipment. One type of spraying equipment capable of use with a two component system is shown in U.S. Pat. No. 6,527,203. One problem encountered in spray foam systems is dripping of the polyurethane foam while it is curing. The extent of dripping of the polyurethane foam may be increased and decreased by modifying the volumetric ratio of the resin component to the isocyanate component. Further, dripping can be controlled by adding additional constituents to the resin component. Most related art systems spray the components at the 1:1 volumetric ratio and add additional constituents. One reason for spraying at a 1:1 volumetric ratio is that the supplies of the resin component and the isocyanate component are consumed at an equal rate and makes order replenishment easy. Another reason is because inexpensive spraying equipment is available to deliver the components at the same volumetric rate. However, spraying at a 1:1 ratio does not always produce adequate physical properties and results in too much dripping.

One example of a polyurethane foam formed from a spray foam system is shown in U.S. Pat. No. 5,449,699. The polyurethane foam includes a polyol component that is amine-initiated and has a tertiary amine catalyst. The polyol component is reacted with an isocyanate component in a weight ratio of 0.9:1 to 1.3:1. However, the polyurethane foam of the '699 patent is a closed-cell polyurethane foam that has a density of greater than 1.5 pound per cubic foot (pcf).

Another example of a polyurethane foam is described in U.S. Pat. No. 4,260,514. The '514 patent discloses a polyurethane foam formed from a brominated diol, other halogen compounds, and three polyols. These halogen compounds are known to those skilled in the art to act as flame retardants. One of the polyols includes an oxyalkylated polyamine present in an amount of from about 4 to about 20 weight percent. These polyols are reacted with an isocyanate to produce the foam having a flame spread characteristic of less than 25. However, the polyurethane foam has a density of greater than 1.5 pcf and uses freon as the blowing agent. The '514 patent does not disclose or suggest forming the polyurethane foam having a density of less than 1 pcf and with water as the blowing agent. The use of freon requires additional equipment, such as pressurized vessels to deliver the constituents and typically results in foams having a density of greater than 1 pcf. Changing blowing agents between water and freon greatly impacts the physical properties of the resultant foam and results in different densities.

In sum, the polyurethane foams formed from the spray foam systems of the related art are characterized by one or more inadequacies. Therefore, it is desirable to provide a formulated resin component for use in a polyurethane spray foam system to produce a polyurethane foam that has a low density and that has improved physical characteristics, such as flame spread characteristics, water absorption, and water vapor permeance.

BRIEF SUMMARY OF THE INVENTION

The subject invention provides a formulated resin component for use in a polyurethane spray foam system to produce a polyurethane foam having a density of less than 1 pound per cubic foot (pcf). The resin component includes a blowing agent, a first polyol having a number-average molecular weight of from 150 to 500 and at least tetra-functionality, and a second polyol having a number-average molecular weight of from 3500 to 8000 and terminal hydroxyl groups. The resin component also includes a curing component having at least one primary amine group and a number-average molecular weight of from 150 to 5000.

The polyurethane spray foam system reacts the a) resin component, above, with b) an isocyanate component that includes diphenylmethane diisocyanate. The system reacts a) and b) in a volumetric ratio having an isocyanate index of from 15 to 70, wherein the ratio is a volumetric ratio of a) to b) of from 1:1.2 to 1:5.

Accordingly, the subject invention overcomes the inadequacies that characterize the related art. Specifically, the composition of the subject invention produces the polyurethane foam having a density of less than 1 pcf and having improved physical characteristics, such as flame spread characteristics, water absorption, and water vapor permeance. The polyurethane foam formed in accordance with the subject invention exhibits a decreased amount of dripping when sprayed overhead at a volumetric ratio of greater than 1:1 than the related art compositions.

BRIEF DESCRIPTION OF THE SEVERAL VIEWS OF THE DRAWING

Other advantages of the present invention will be readily appreciated, as the same becomes better understood by reference to the following detailed description when considered in connection with the accompanying drawings wherein.

DETAILED DESCRIPTION OF THE INVENTION

Figure 1:
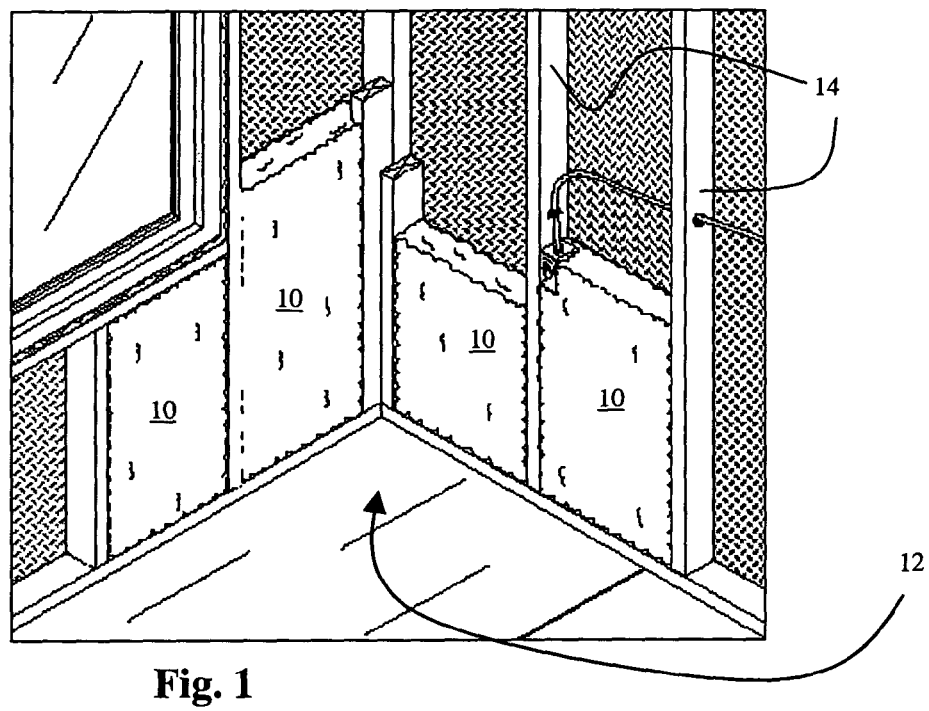
FIG. 1 is a perspective view of a structure, such as a building, having an open-celled polyurethane foam sprayed into open cavity walls for insulation.
Figure 2:
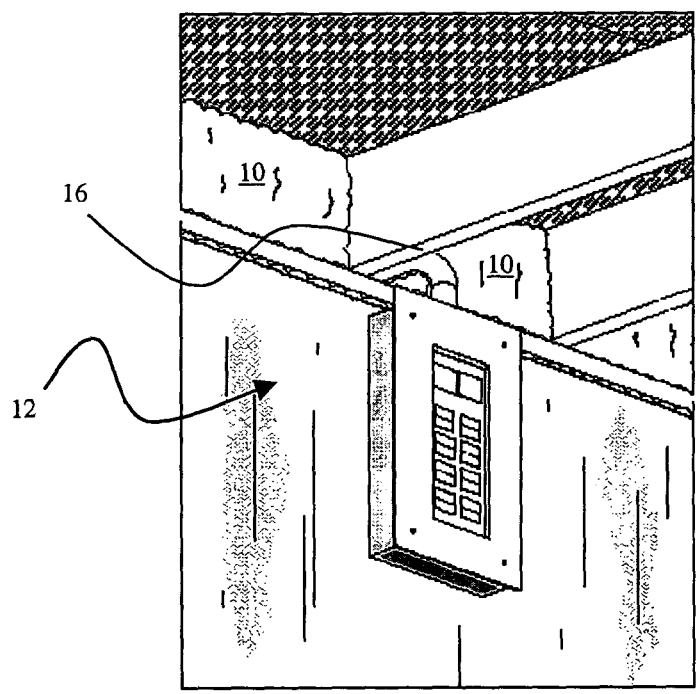
FIG. 2 is a perspective view of the structure having the open-celled polyurethane foam sprayed between floor joists.

Referring to the Figures, wherein like numerals indicate like or corresponding parts throughout the several views, an open-celled polyurethane foam is generally shown at 10 in FIGS. 1 and 2. The polyurethane foam 10 is formed in a polyurethane spray foam system known to those skilled in the art. The spray foam system of the subject invention is typically referred to as a spray-in-place spray foam system. These systems spray two components as a liquid into a desired space. After spraying, the components begin to rise, cream, and gel forming the polyurethane foam. It is to be appreciated that the components may begin to react as they are sprayed, but this is distinguished from the froth spraying systems known to those skilled in the art where what is sprayed has already begun cream and form the foam. Additionally, spray-in-place systems do not require specialized equipment, such as pressurized containers for the components. The spray system produces the polyurethane foam 10 of the subject invention to have a density of less than 1 pound per cubic foot (pcf), or 16.02 kilograms per cubic meter ($kg/m^3$). Preferably, the polyurethane foam 10 has a density of less than 0.75 pcf, or 12.01 $kg/m^3$, and more preferably a density of about 0.5 pcf, or 8.01 $kg/m^3$. The low density polyurethane foam allows less foam to be sprayed, while achieving a desired insulation value. Higher density foams require more foam to be sprayed which increases the cost of the system and makes it less desirable.

The polyurethane foam 10 is particularly useful as an insulating material for use in a building structure 12. Referring to FIG. 1, the polyurethane foam 10 is shown as having been sprayed between typical wall studs 14 forming an open cavity wall of the building structure 12. FIG. 2 illustrates the polyurethane foam 10 having been sprayed between typical floor joists 16 of the building structure 12. The polyurethane foam 10 has a low water absorption of less than 10 percent by volume of the polyurethane foam 10, preferably less than 5 percent by volume, and more preferably between 3 to 5 percent by volume. Water absorption, as known to those skilled in the art, is the ability of the polyurethane foam to absorb water from any source, such as condensation. The polyurethane foam formed according to the subject invention is open celled and exhibits a low amount of water absorption, which is desirable for insulation materials. This low water absorption is highly unexpected, since the polyurethane foam is open-celled and typically open-celled foams absorb large amounts of water.

The spray foam system mixes a) a formulated resin component with b) an isocyanate component. The resin component includes a blowing agent being water. It is preferred that the blowing agent is present in an amount of from 15 to 40 parts by weight based on 100 parts by weight of the resin component. More preferably, the water is present in an amount of from 20 to 30 parts by weight, and most preferably from 24 to 26 parts by weight based on 100 parts by weight of the resin component.

The resin component also includes a first polyol having a number-average molecular weight of from 150 to 500 and having at least tetra-functionality. Preferably, the first polyol is an amine-initiated polyol, and more preferably, it is an aliphatic, amine-initiated polyol. Further, the first polyol has a number-average molecular weight of preferably from 250 to 500, and most preferably from 250 to 400. The first polyol has a hydroxyl number of from 250 to 1000, preferably from 400 to 825, and most preferably from 450 to 800. A suitable first polyol includes, but is not limited to, POLY-Q® 40-800, commercially available from Arch Chemicals, Inc. The first polyol is present in an amount of from 5 to 25 parts by weight based on 100 parts by weight of the resin component, preferably from 10 to 20, and more preferably from 11 to 14 parts by weight based on 100 parts by weight of the resin component.

A second polyol may be included in the resin component having a number-average molecular weight of from 3500 to 8000. Preferably, the second polyol has a number-average molecular weight of from 4000 to 7500, and more preferably from 5000 to 7000. The second polyol has terminal hydroxyl groups, such as triols and diols. The second polyol has a hydroxyl number of from 20 to 100, preferably from 20 to 60, and more preferably from 25 to 58. A suitable second polyol includes, but is not limited to, PLURACOL® 380, commercially available from BASF Corp. The second polyol is present in an amount of from 5 to 25 parts by weight based on 100 parts by weight of the resin component, preferably from 10 to 20 parts by weight, and more preferably from 11 to 14 parts by weight based on 100 parts by weight of the resin component.

The subject invention further includes a curing component having at least one primary amine group and having a number-average molecular weight of from 150 to 5000. Primary amine groups are known to those skilled in the art to include one organic substituent, R, attached to a nitrogen atom having the general formula of R—$NH_2$. The curing component preferably has a number-average molecular weight of from 250 to 5000. The curing component is present in an amount of from 2 to 15 parts by weight based on 100 parts by weight of the resin component, preferably from 5 to 12 parts by weight, and more preferably from 9 to 11 parts by weight based on 100 parts by weight of the resin component. The curing component has an equivalent hydroxyl number of from 20 to 800, preferably 30 to 600, and more preferably from 30 to 450. The primary amine groups are more reactive than the other polyols and improves the rise, gel, and cure time of the polyurethane foam, which reduces the amount of dripping. Further, the primary amine groups may contribute to the open-celled polyurethane foam 10 having decreased water absorption.

In one embodiment, the curing component is a polyether amine having the at least one primary amine group. The polyether amine may be tri-functional having three primary amine groups with a number-average molecular weight of from 400 to 5000, such as a polyether triamine. One such polyether triamine is polyoxypropylenetriamine. The polyether amine may also be di-functional having two primary amine groups with a number-average molecular weight of from 200 to 2000, such as a polyether diamine. One such polyether diamine is polyoxypropylenediamine. Some suitable examples of the curing component include, but are not limited to, JEFFAMINE® T-403, and JEFFAMINE® D-2000, both commercially available from Huntsman Performance Chemicals.

The resin component may also include additives selected from at least one of a catalyst, an emulsifier, a surfactant, and a flame retardant. The catalyst, when used, is present in an amount of from greater than 0 to 18 parts by weight based on 100 parts by weight of the resin component, preferably from 0 to 10 parts by weight, and most preferably from 0.5 to 8 parts by weight based on 100 parts by weight of the resin component. Suitable examples of the catalyst include pentamethyldiethyltriamine, dimethyltin dimercaptide, dimethylethanolamine, and mixtures thereof. However, it is to be appreciated that other catalysts are known to those skilled in the art and may be used with the subject invention Another additive useful with the subject invention includes the emulsifier. When used, the emulsifier is present in an amount of from greater than 0 to 5 parts by weight based on 100 parts by weight of the resin component, preferably from 0.5 to 3 parts by weight, and most preferably from 1 to 2 parts by weight based on 100 parts by weight of the resin component. A suitable emulsifier is oleic acid. The oleic acid also aids in keeping the resin homogenous, thereby eliminating the need to mix the resin prior to spraying.

Additionally, other emulsifiers may be included to aid the mixing between the resin and isocyanate components. A suitable emulsifier for reacting with the isocyanate includes, but is not limited to, nonyl phenol ethoxylate. The emulsifier for reacting with the isocyanate may be present in an amount of from greater than 0 to 10 parts by weight based on 100 parts by weight of the resin component, preferably from 1 to 5 parts by weight, and more preferably from 1.5 to 3 parts by weight based on 100 parts by weight of the resin component. However, it is to be appreciated that other emulsifiers for reacting with the isocyanate are known to those skilled in the art and may be used with the subject invention.

The surfactant, when used, is present in an amount of from greater than 0 to 5 parts by weight based on 100 parts by weight of the resin component, preferably from 0.1 to 3 parts by weight, and most preferably from 0.5 to 1.5 parts by weight based on 100 parts by weight of the resin component. A suitable surfactant includes, but is not limited to, silicon surfactant. However, it is to be appreciated that other surfactant are known to those skilled in the art and may be used with the subject invention The resin component may also include the flame retardant, which when used is present in an amount of from 15 to 40 parts by weight based on 100 parts by weight of the resin component, preferably from 20 to 30 parts by weight, and more preferably from 21 to 27 parts by weight based on 100 parts by weight of the resin component. The flame retardant preferably includes an organic phosphorus compound. A suitable example of flame retardant includes, but is not limited to, ANTI-BLAZE® 100, commercially available from Rhodia.

The subject invention also includes the b) isocyanate component. The isocyanate component may include diphenylmethane diisocyanate (MDI) and mixture thereof. Further, the MDI may include monomeric MDI (MMDI), which includes both 4,4-MDI and 2,4-MDI and polymeric MDI (PMDI), which includes two or more aromatic groups as is known to those skilled in the art. It is preferred that the isocyanate component includes mixtures of PMDI and MMDI. More preferably, the PMDI is present in an amount of from 30 to 70 parts by weight based on 100 parts by weight of the isocyanate component and the MMDI is present in an amount of from 30 to 70 parts by weight based on 100 parts by weight of the isocyanate component. A suitable isocyanate component includes, but is not limited to, LUPRANATE® M20S, commercially available from BASF Corp.

The system reacts a) the resin component and b) the isocyanate component in a volumetric ratio having an isocyanate index of from 15 to 70, preferably in a ratio having an isocyanate index of from 25 to 60, and more preferably in a ratio having an isocyanate index of from 25 to 55. The isocyanate index is achieved by spraying a) to b) in a volumetric ratio of from 1:1.2 to 1:5, preferably from 1:1.2 to 1:3, and most preferably from 1:1.25 to 1:2. When sprayed at these ratios, the primary amine groups are present in an amount such that they react faster with the isocyanate component than the other constituents. More specifically, but in no way limiting, by spraying at a higher index, more unreacted hydroxyl groups of the high molecular weight polyol are bound, and this prevents the foam from dripping while burning. By spraying off-ratio, the dripping during burning is prevented and therefore a lower flame spread number is obtained. Therefore, the isocyanate index is between 15 and 70 to ensure that there are sufficient isocyanate groups to bind up the unreacted hydroxyl groups to cure the polyurethane foam 10. The resultant open-celled polyurethane foam 10 has a density of less than 1 pound per cubic foot and has low water absorption as will be illustrated in the following example.

The spray system may be sprayed with any typical two component spraying equipment, which includes a two component spray gun, as is known to those skilled in the art. The two components, a) and b), are typically mixed once they enter and exit a nozzle of the spray gun. The system must be able to spray the components a) and b) at the specified volumetric ratios. Once the two components are mixed, the polyurethane foam 10 begins to form. The polyurethane foam 10 then exhibits a cream time, a gel time, and a rise time. The polyurethane foam 10 has the cream time of about 2 seconds±1 second, the gel time of about 4.5 seconds±1 second, and the rise time of 8.0 seconds±2 seconds. When spraying the polyurethane foam 10, it is important to have quick cream, gel, and rise times to prevent the polyurethane foam 10 from dripping while it is being sprayed, as described above. This is particularly true when the polyurethane foam 10 is being sprayed overhead. The subject invention provides the polyurethane foam 10 capable of being sprayed overhead with decreased dripping.

The following examples, illustrating the formation of the polyurethane foam according to the subject invention and illustrating certain properties of the polyurethane foam, as presented herein, are intended to illustrate and not limit the invention.

Example

A open-cellular polyurethane foam 10 was formed in accordance with the subject invention as described above and having the composition shown in Table 1 below.

TABLE 1

| Formulation of Resin and Isocyanate Component | |
|---|---|
| | Parts By Weight |
| Resin Component | |
| Curing Component | 10.00 |
| First Polyol | 17.50 |
| Second Polyol | 15.00 |
| Flame Retardant | 21.60 |
| Blowing Agent | 25.00 |
| Catalyst A | 0.90 |
| Catalyst B | 0.50 |
| Catalyst C | 5.00 |
| Emulsifier | 1.50 |
| Surfactant | 1.00 |
| Isocyanate Emulsifier | 2.00 |
| Total | 100.00 |
| Isocyanate Component | |
| Isocyanate | 100.00 |
| Total | 100.00 |

The curing component is JEFFAMINE® T-403, which is polyoxypropylenetriamine having a number-average molecular weight of 440. The first polyol is POLY-Q® 40-800, which is a tetra-functional, aliphatic amine-initiated polyol having a number-average molecular weight of 280. The second polyol is PLURACOL® 380, which is a primary hydroxyl, terminated triol having a number-average molecular weight of 6500. The flame retardant is ANTI-BLAZE® 100. The blowing agent is water. Catalyst A is pentamethyldiethyltriamine, Catalyst B is dimethyltin dimercaptide, and Catalyst C is dimethylethanolamine. The emulsifier is oleic acid and surfactant is a silicon surfactant. The isocyanate emulsifier is nonyl phenol ethoxylate. The isocyanate is LUPRANATE® M20S.

The a) resin component and the b) isocyanate component were sprayed at a volumetric ratio of 1:1.5. The resultant polyurethane foam 10 was prepared into a sample and tested for various physical properties, such as density, compressive strength, water absorption, water vapor transmission, and flame spread characteristics. The sample was analyzed using the following test equipment: Instron Model 5500R, Mettler Balance Model, LaserComp Fox 600, Mitutoya 12 in. Digimatic Caliper, and Mitutoya 24 in. Digimatic Caliper.

The sample was tested in accordance ASTM D 1622-98 "Standard Test Method for Apparent Density of Rigid Cellular Plastics", ASTM D 1621-00 "Standard Test Method for Compressive Properties of Rigid Cellular Plastics" Procedure A, ASTM C 518-98 "Standard Test Method for Steady-State Thermal Transmission Properties by Means of the Heat Flow Meter Apparatus", ASTM D 2126-99 "Standard Test Method for Response of Rigid Cellular Plastics to Thermal and Humid Aging", and ASTM D 2842-97 "Standard Test Method for Water Absorption of Rigid Cellular Plastics". The physical properties for the polyurethane foam 10 is shown in Table 2.

TABLE 2

Physical Properties of the polyurethane foam

| Physical Property | |
|---|---|
| Density, $kg/m^3$ | 8.26 |
| Compressive Strength, kPa | 12.40 |
| Thermal Resistivity, m K/W | 26.38 |
| Water Vapor Permeance, $ng/Pa\ s\ m^2$ (specimen thickness 25.4 mm) | 894.00 |
| Dimensional Stability, % | |
| 28 days at 80° C. | 1.40 |
| 28 days at 70° C. and 95% RH | 5.70 |
| 28 days at −29° C. | 0.50 |

Various water vapor transmission properties were tested in accordance with ASTM E 96-00 "Standard Test Method for Water Vapor Transmission & Materials," Procedure A. The samples were cut and mounted into an apparatus that conforms to the ASTM E 96-95 test specification. The test specimens were conditioned in a constant humidity chamber for 24 hours before data collection started.

In accordance with ASTM E 96-95, dry cup and wet cup measurements were obtained. The test specimens were placed in a constant humidity chamber at 50% relative humidity±1% and at temperature 23° C.±0.1° C. The specimens were weighed at regular intervals. The samples obtained constant water vapor transmission rate, which were used in the calculations to determine water vapor transmission properties. Table 3 illustrates the results for water vapor transmission (wvt), permeance, and permeability for both the dry cup and the wet cup.

TABLE 3

Test results of low density sprayed polyurethane foam

| | wvt ($g/s\ m^2$) | Permeance ($kg/m^2\ s\ Pa$) | Permeability ($kg/m\ s\ Pa$) |
|---|---|---|---|
| Dry Cup | $1.95 \times 10^{-4}$ | $1.412 \times 10^{-10}$ | $2.140 \times 10^{-11}$ |
| Wet Cup | $1.88 \times 10^{-4}$ | $1.375 \times 10^{-10}$ | $2.093 \times 10^{-11}$ |

Various burning characteristics were also determined for the polyurethane foam 10 prepared according to the subject invention. Specifically, the Flame Spread Classification and Smoke Developed were determined based upon testing conducted in accordance with CAN/ULC-S 102 "Standard Test Method of Test for Surface Burning Characteristics of Building Materials and Assemblies" and ULC-S 127 "Standard Corner Wall Method of Test for Non-Melting Building Materials"

The CAN/ULC-S 102 method is designed to determine the relative surface burning characteristics of materials under specific test conditions. Results are expressed in terms of Flame Spread Classification (FSC1) and smoke developed (SD). In addition to a tunnel test for foam plastic insulation products, the standard also cites ULC-S 127. Although the procedure is applicable to materials, products and assemblies used in building construction for development of comparative surface spread of flame data, the test results may not reflect the relative surface burning characteristics of tested materials under all building fire conditions.

The sample was conditioned to constant mass at a temperature of 23° C. and a relative humidity of 50% prior to testing. The tunnel was preheated to 85° C., as measured by a backwall-embedded thermocouple located 7090 mm downstream of the burner ports, and allowed to cool to 40° C., as measured by the backwall-embedded thermocouple located 4000 mm from the burner ports. At this time, the tunnel lid was raised and the sample was placed along the ledges of the tunnel to form a continuous ceiling 7315 mm long and 305 mm above the floor. The lid was then lowered into place.

Figure 3:
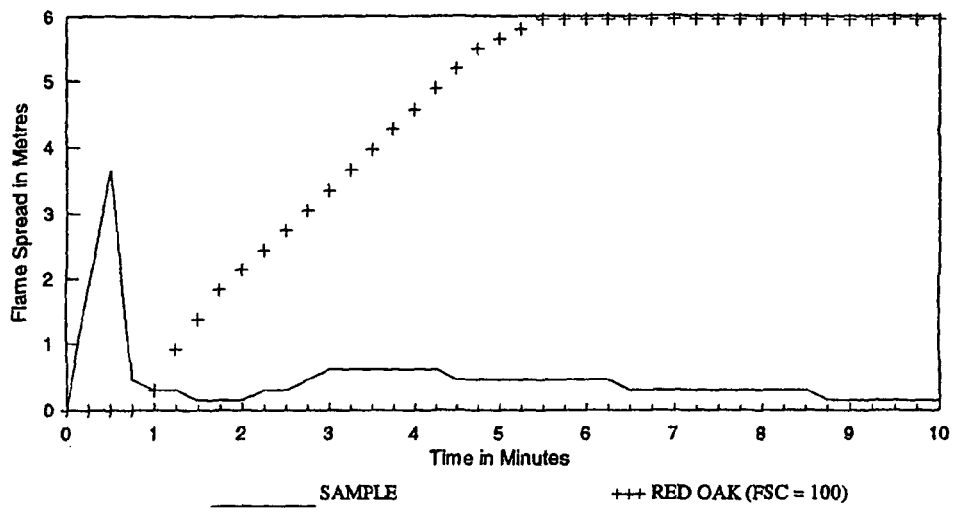
FIG. 3 is a graphical illustration of a flame spread classification based on flame spread versus time for a polyurethane foam formed according to the subject invention.
Figure 4:
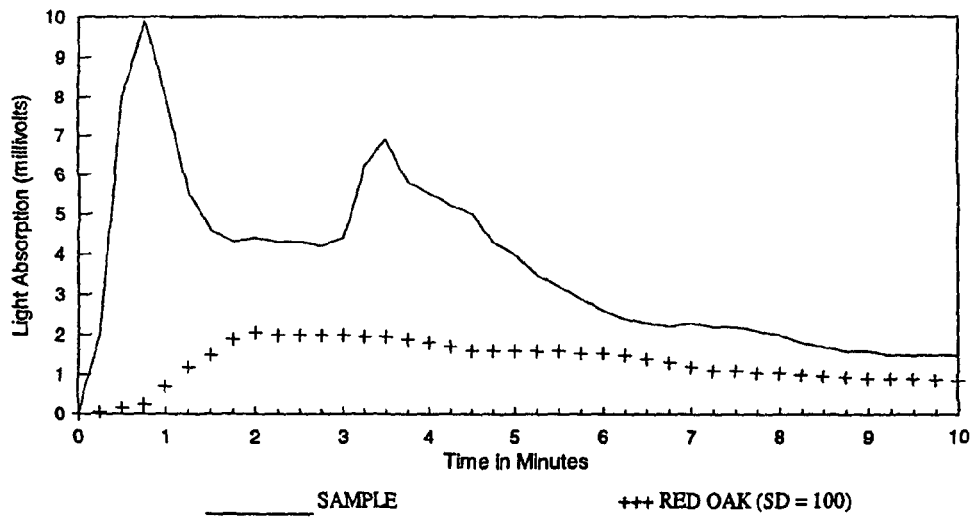
FIG. 4 is a graphical illustration of an amount of smoke developed for the polyurethane foam based upon light absorption versus time.

Upon ignition of the burner ports, the flame spread distance was observed and recorded every 15 seconds. Flame spread distance versus time was plotted ignoring any flame front recessions, which is graphically shown in FIG. 3. If the area under the curve (A) is less than or equal to 29.7 m-min, then FSC1=1.85×A; if greater, then FSC1=1640/(59.4-A). Smoke developed is determined by comparing the area under the obscuration curve for the test sample to that of inorganic reinforced cement board and red oak, arbitrarily established as 0 and 100, respectively, which is graphically shown in FIG. 4.

During the testing of some materials, particularly those of low thermal inertia, the flame may show an anomalous behavior. This is apparent when the flame front initially progresses rapidly, as is characteristic of a highly flammable material, but then slows down or fails to advance farther, typically not reaching the end of the specimen during the test period. In such cases the Flame Spread Classification (FSC2) is determined by the application of a rate equation:

Flame Spread Classification (FSC2)=95.2×d/t wherein "t" is the time in minutes for the flame front to propagate a distance "d" meters where there is a marked reduction in the advance of the flame front. In certain cases where there is difficulty in accurately determining "d" or "t", or where there is an unusual condition such as the formation of a char layer inhibiting propagation subsequent to an initial flash, the FSC2 shall be determined by consideration of the results from a test conducted in accordance with ULC-S127.

The inside surfaces of the ULC-S127 Corner Wall Test Apparatus are lined with the test material and a specified burner was positioned on the floor of the corner adjacent to the two interior walls. The burner was ignited and the time of issuance of flame from beneath the canopy, fracture of the cotton thread, or recession of the flame front are determined. This time was then convened to FSC2 by reference to a correlation graph in the S127 standard.

The polyurethane foam 10, formed according to the subject invention, produced a FSC1 of 62.5 and a SD of 260. Using the rate equation, shown above, the polyurethane foam 10 has a FSC2 of 565. The corner wall test was also performed in accordance with S127 and produced a FSC2 of 430. The result of test S127 takes precedence over the rate equation, therefore, the polyurethane foam 10 has a FSC2 of 430 and a SD of 260.

Obviously, many modifications and variations of the present invention are possible in light of the above teachings. The invention may be practiced otherwise than as specifically described within the scope of the appended claims.

What is claimed is:

1. A polyurethane foam for insulating structures that is produced from a polyurethane spraying system, said polyurethane foam being the reaction product of:
   a) a resin component comprising;
      a blowing agent present in an amount of from 15 to 40 parts by weight based on 100 parts by weight of said resin component,
      a first polyol used in an amount of from 5 to 25 parts by weight based on 100 parts by weight of said resin component and having a number-average molecular weight of from 150 to 500 and having a hydroxyl number of from 250 to 1000 and having at least tetra-functionality,
      a second polyol having a number-average molecular weight of from 3500 to 8000 and having a hydroxyl number of from 20 to 100 and having terminal hydroxyl groups, and
      a curing component used in an amount of from 2 to 15 parts by weight based on 100 parts by weight of said resin component and comprising a polyether amine having at least one primary amine group, an equivalent hydroxyl number of from 20 to 800, and having a number-average molecular weight of from 150 to 5000, and
   b) an isocyanate component comprising diphenylmethane diisocyanate;
   wherein said a) and b) are reacted in a volumetric ratio having an isocyanate index of from 25 to 60; and
   wherein said polyurethane foam is open-celled and has a density of less than 1 pound per cubic foot and low water absorption as a result of reacting said a) and b) in said volumetric ratio at said isocyanate index.

2. A polyurethane foam as set forth in claim 1 wherein said polyurethane foam has a water absorption of less than 10 percent by volume of said polyurethane foam.

3. A polyurethane foam as set forth in claim 1 wherein said polyurethane foam has a water absorption of less than 5 percent by volume of said polyurethane foam.

4. A polyurethane foam as set forth in claim 1 wherein said curing component has a number average molecular weight of from 250 to 2500.

5. A polyurethane foam as set forth in claim 1 wherein said first polyol is further defined as an aliphatic, amine-initiated polyol.

6. A polyurethane foam as set forth in claim 1 wherein said second polyol is used in an amount of from 5 to 25 parts by weight based on 100 parts by weight of said resin component.

7. A polyurethane foam as set forth in claim 1 wherein said second polyol is further defined as a triol.

8. A polyurethane foam as set forth in claim 1 wherein said second polyol is further defined as a diol.

9. A method of forming a polyurethane foam for insulating structures dispensed from a polyurethane spraying system, said method comprising the steps of:
   providing a) a resin component including a blowing agent present in an amount of from 15 to 40 parts by weight based on 100 parts by weight of said resin component, a first polyol present in an amount of from 5 to 25 parts by weight based on 100 parts by weight of said resin component and having a number-average molecular weight of from 150 to 500, having a hydroxyl number of from 250 to 1000, and having at least tetra-functionality, a second polyol having a number-average molecular weight of from 3500 to 8000, having a hydroxyl number of from 20 to 100, and having terminal hydroxyl groups, and a curing component present in an amount of from 2 to 15 parts by weight based on 100 parts by weight of said resin component and comprising a polyether amine having at least one primary amine group, an equivalent hydroxyl number of from 20 to 800, and having a number-average molecular weight of from 150 to 5000,
   providing b) an isocyanate component comprising diphenylmethane diisocyanate; and
   reacting a) and b) in a volumetric ratio of from 1:1.2 to 1:3 such that a) and b) are reacted having an isocyanate index of from 25 to 60 such that the polyurethane foam is open-celled and has a density of less than 1 pound per cubic foot and low water absorption as a result of reacting a) and b) in the volumetric ratio at the isocyanate index.

10. A method as set forth in claim 9 wherein the step of reacting a) and b) is further defined as spraying a) and b).

11. A method as set forth in claim 10 wherein the step of spraying a) and b) is further defined as mixing a) and b) through a nozzle of a spray gun.

12. A method as set forth in claim 9 wherein the curing component has a number average molecular weight of from 250 to 2500.

* * * * *